United States Patent
Kawaguchi et al.

(10) Patent No.: US 10,096,399 B2
(45) Date of Patent: Oct. 9, 2018

(54) WIRE HARNESS SHEET, WIRE HARNESS, AND METHOD OF MANUFACTURING WIRE HARNESS

(71) Applicant: Yazaki Corporation, Tokyo (JP)

(72) Inventors: Kenichiro Kawaguchi, Susono (JP); Mitsunori Tsunoda, Toyota (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 183 days.

(21) Appl. No.: 14/378,802

(22) PCT Filed: Feb. 15, 2013

(86) PCT No.: PCT/JP2013/053742
§ 371 (c)(1),
(2) Date: Aug. 14, 2014

(87) PCT Pub. No.: WO2013/122224
PCT Pub. Date: Aug. 22, 2013

(65) Prior Publication Data
US 2016/0019998 A1    Jan. 21, 2016

(30) Foreign Application Priority Data

Feb. 16, 2012  (JP) .................................. 2012-032013
Feb. 16, 2012  (JP) .................................. 2012-032014

(51) Int. Cl.
*H02G 11/00*     (2006.01)
*H01B 7/00*      (2006.01)
(Continued)

(52) U.S. Cl.
CPC ....... *H01B 7/0045* (2013.01); *B60R 16/0215* (2013.01); *H01B 13/01281* (2013.01); *H02G 3/0487* (2013.01); *H01B 13/0129* (2013.01)

(58) Field of Classification Search
CPC ....... H02G 3/04; H02G 11/00; B60R 16/0215
(Continued)

(56) References Cited

U.S. PATENT DOCUMENTS 6,239,374 B1     5/2001  Kastner
2011/0083899 A1*  4/2011  Mori ................... B60R 16/0215
                                              174/72 A
(Continued)

FOREIGN PATENT DOCUMENTS

CN          1259224 A        7/2000
CN        102067741 A        5/2011
(Continued)

OTHER PUBLICATIONS

Extended European Search Report dated Sep. 16, 2015 issued by European Patent Office in counterpart European Patent Application No. 13748917.5.
(Continued)

*Primary Examiner* — Hoa C Nguyen
*Assistant Examiner* — Stanley Tso
(74) *Attorney, Agent, or Firm* — Sughrue Mion, PLLC

(57) ABSTRACT

Provided is a wire harness sheet by which it is possible to manually fix an electric wire bundle at an exact position without bending the electric wire bundle. A wire harness sheet 11 includes a sheet base material 13 that has a rectangular shape formed by a pair of first side portion 19 and a second side portion 21 in parallel with each other and by a third side portion 23 and a fourth side portion 25 orthogonal to the first side portion 19 and the second side portion 21; an adhesive layer 15 that is provided on one surface of the sheet base material 13; and a slit 17 which is cut into the sheet base material 13 in such a manner that the slit is formed along and in parallel with each the third side portion 23 and the fourth side portion 25 between each the (Continued)

first side portion 19 and the second side portion 21, and a placement region 31 of an electric wire bundle 27.

6 Claims, 15 Drawing Sheets

(51) Int. Cl.
    *B60R 16/02*     (2006.01)
    *H02G 3/04*     (2006.01)
    *H01B 13/012*     (2006.01)

(58) Field of Classification Search
    USPC ........................................................ 174/72 A
    See application file for complete search history.

(56) References Cited

U.S. PATENT DOCUMENTS

| | | | |
|---|---|---|---|
| 2011/0088945 A1 | 4/2011 | Yanagimoto et al. | |
| 2011/0226751 A1* | 9/2011 | Lazanja | B60N 2/5685 219/217 |

FOREIGN PATENT DOCUMENTS

| | | | | |
|---|---|---|---|---|
| DE | 20111731 | U1 | 10/2001 | |
| DE | 10118975 | A1 | 11/2002 | |
| JP | 07-20023 | U | 4/1995 | |
| JP | 09-035537 | A | 2/1997 | |
| JP | 09-147630 | A | 6/1997 | |
| JP | 2007-288898 | A | 11/2007 | |
| JP | 2011-199992 | * | 10/2011 | ............... H02G 3/04 |
| JP | 2011-199992 | A | 10/2011 | |
| JP | 2011-205790 | * | 10/2011 | ............... H02G 3/04 |
| JP | 2011-205790 | A | 10/2011 | |

OTHER PUBLICATIONS

Written Opinion for PCT/JP2013/053742 dated Mar. 19, 2013 [PCT/ISA/237].
Office Action dated Feb. 26, 2016, by the Japanese Patent Office in counterpart Japanese Application No. 2012-032013.
Office Action dated Feb. 26, 2016, by the Japanese Patent Office in counterpart Japanese Application No. 2012-032014.
International Search Report for PCT/JP2013/053742 dated Mar. 19, 2013 [PCT/ISA/210].
Communication from the State Intellectual Property Office of P.R. China dated May 19, 2016 in a counterpart Chinese application No. 201380009938.3.
Office Action dated Dec. 15, 2016, by the State Intellectual Property Office of P.R. China in counterpart Chinese Application No. 201380009938.3.
Office Action dated Jun. 7, 2017 by the State Intellectual Property Office of P.R. China in counterpart Chinese Patent Application No. 201380009938.3.
Communication dated Sep. 20, 2017, issued by the European Patent Office in counterpart European Patent Application No. 13748917.5.
Communication dated Apr. 19, 2018, from the European Patent Office in counterpart European Application No. 13748917.5.

* cited by examiner (a)

(b)

WIRE HARNESS SHEET, WIRE HARNESS, AND METHOD OF MANUFACTURING WIRE HARNESS

TECHNICAL FIELD

The present invention relates to a wire harness sheet, a wire harness, and a method of manufacturing the wire harness.

BACKGROUND ART

In many cases, a tape is wound around a wire harness including a large number of electric wire bundles wired in a vehicle, so as to bundle and protect the electric wire bundles. In recent years, the tape wrapping is not used for the reduction of working man-hours. A sheet, which is bonded to the electric wire bundles at once so as to bundle and protect the electric wire bundles, is increasingly used.

As illustrated in FIGS. 16(a) and 16(b), an adhesive layer is formed on only one surface of a wire harness sheet 501. An electric wire bundle 503 is protected by peeling release paper off the wire harness sheet 501, by setting the electric wire bundle 503 at a designated position on the wire harness sheet 501, and by bonding together adhesive surfaces.

FIG. 17 is a plan view illustrating main portions of a wire harness sheet that is folded back and adhesively fixed to a bending portion of an electric wire bundle, and illustrating a wire harness.

A wire harness sheet 531 illustrated in FIG. 17 is formed of a piece of sheet base material 529, and an adhesive layer is provided on only one surface of the wire harness sheet 531. The wire harness sheet 531 is folded back along a broken line portion 523, and is adhesively fixed to a bending portion 527 of an electric wire bundle 525.

FIG. 18 is a plan view illustrating main portions of wire harness sheets that overlap each other and are adhesively fixed to the bending portion of the electric wire bundle, and illustrating a wire harness.

A wire harness sheet 541 illustrated in FIG. 18 is formed of two pieces of sheet base materials 543 and 545, and an adhesive layer is provided on only one surface of each of the sheet base materials 543 and 545. The adhesive layers overlap each other, while facing each other, and are adhesively fixed to the bending portion 527 of the electric wire bundle 525. A sheet base material is required to be cut to a bending shape of the electric wire bundle 525 so as to obtain the wire harness sheets 531 and 541 of the related art.

As illustrated in FIG. 19(a), PTL 1 discloses a wire harness branched portion protective structure in which a protective sheet 513 having an adhesive layer on a back surface thereof is wound around and is fixedly attached to a T-shaped harness branched portion 511 in which a branch wire 509 branches off from a main wire 507.

The protective sheet 513 has a crossed shape in which slits 521 are formed on both ends of a cross-shaped connection portion 519 that connects a vertical portion 515 and a horizontal portion 517. As illustrated in FIG. 19(b), the protective sheet 513 is fixedly attached to the main wire 507 and the branch wire 509 by winding the cross-shaped connection portion 519 around an outer circumferential surface of the main wire 507, the outer circumferential surface being positioned opposite to a branched portion, and by respectively winding both the horizontal portions 517 in a spiral shape around the entire outer circumferential surfaces of the main wire 507 on both sides of the branched portion in such a manner that parts of the horizontal portion 517 overlap each other. In contrast, both sides of the vertical portion 515 are fixedly attached to facing semi-circumferential surfaces of the branched portion 511, respectively, the outer semi-circumferential surface ranging from the main wire 507 to the branch wire 509. Both vertical portions 515 are bonded together and fixedly attached together on both sides of the main wire 509. In doing so, the protective sheet 513 covers the entire outer circumferential surfaces of the main wire 507 and the branch wire 509 at a branch position.

CITATION LIST

Patent Literature

[PTL 1] JP-A-2007-288898

SUMMARY OF INVENTION

Technical Problem

However, an adhesive is applied to a bonding surface of the wire harness sheet 501 illustrated in FIGS. 16(a) and 16(b). When the electric wire bundle 503 is first bonded to the adhesive surface, it is difficult to peel the electric wire bundle 503 off from the adhesive surface. Accordingly, in some cases, the electric wire bundle 503 bends as illustrated in FIG. 16(a), or is not placed at an ideal position. When the wire harness sheet 501 is bonded to itself in this state, as illustrated in FIG. 16(b), the appearance of a wire harness 505 deteriorates, or the length of the electric wire bundle 503 becomes shorter than a predetermined length. For this reason, in a method of manufacturing the wire harness with the wire harness sheet 501 of the related art, an operator has to manufacture the wire harness with care, and it takes considerable time to manufacture the wire harness. In contrast, the use of special manufacturing equipment such as a locating fixture increases manufacturing costs.

The sheet base material is required to be cut to the bending shape of the electric wire bundle 525 so as to obtain the wire harness sheets 531 and 541 illustrated in FIGS. 17 and 18, thereby decreasing a yield rate, and increasing costs. Since it is necessary to perform an adhesive operation while aligning the position of the wire harness sheet 531 or 541 with the electric wire bundle 525, the operator has to be skillful so as to adhesively fix the wire harness sheet 531 or 541 to the electric wire bundle 525 while aligning the wire harness sheet 531 or 541 with the bending shape of the electric wire bundle 525. When the electric wire bundle 525 is unintentionally bonded to the adhesive, it takes time to peel the electric wire bundle 525 off from the adhesive, or a part of the adhesive breaks off from the sheet base material 529, or the sheet base materials 543 and 545, and is then attached to the electric wire bundle 525. The operator has to manufacture the wire harness with care, and it takes considerable time to manufacture the wire harness.

Since the protective sheet 513 illustrated in FIGS. 19(a) and 19(b) has a crossed shape, there is a problem in that a center portion of the covering swells out to form a large diameter when the protective sheet 513 is applied to the linear electric wire bundle 503. Since die cutting is required for the manufacturing of the protective sheet 513, costs increase. Since the shape of the protective sheet 513 is complicated, it is not easy to store, transport, or handle the protective sheet 513.

The present invention is made in light of the problems. A first object of the present invention is to provide a wire harness sheet, a wire harness and a method of manufacturing the wire harness, in which it is possible to manually fix an electric wire bundle at an exact position without using special machines and bending the electric wire bundle.

A second object of the present invention is to provide a wire harness sheet, a wire harness and a method of manufacturing the wire harness, in which it is possible to reduce costs via an improvement in yield rate, and to easily perform an operation.

Solution to Problem

The first object of the present invention is achieved with the following configurations (1) to (5).

(1) A wire harness sheet comprising:
a sheet base material having a rectangular shape formed by a first side portion and a second side portion which are parallel with each other and by a third side portion and a fourth side portion which are orthogonal to the first side portion and the second side portion;
an adhesive layer provided on one surface of the sheet base material on which an electric wire bundle is placed in parallel with the first side portion and the second side portion; and
a slit, cut into the sheet base material between at least one of the first side portion and the second side portion and a placement region of the electric wire bundle, provided proximate to the third side portion and the fourth side portion respectively, and formed along each of the third side portion and the fourth side portion respectively.

In the wire harness sheet with the (1) configuration, the linearly stretched electric wire bundle is placed in the placement region of the sheet base material. In addition, the sheet base material is fixed to the electric wire bundle by a pair of preliminary fixing sheet piece portions in which ends of the placement region are formed on outer sides of the slits. Both side portions of the flat-shaped sheet base material are fixed to both side portions of the linear electric wire bundle, and the sheet base material is fixed to the electric wire bundle, in a state of lying along the linear electric wire bundle. In this state, when a main fixing sheet portion interposed between the pair of preliminary fixing sheet piece portions is bonded to the electric wire bundle, the main fixing sheet portion is fixed to the electric wire bundle at an exact position. The reason is because the sheet base material is located with respect to the electric wire bundle by the preliminary fixing sheet piece portions. When the sheet base material is fixed to the electric wire bundle, the preliminary fixing sheet piece portion and the main fixing sheet portion have the same width or the same diameter. Furthermore, the sheet base material has a rectangular shape, and thus the sheet base material can be manufactured at a low cost, and is easy to handle (easy to store or transport).

(2) The wire harness sheet according to the (1) configuration, wherein
the placement region is provided so as to be equidistant from the first side portion and the second side portion, and
the slit is cut into the sheet base material from both of the first side portion and the second side portion.

In the wire harness sheet with the (2) configuration, the sheet base material is folded in half and bonded to itself, having the position of the electric wire bundle, which is placed at a center portion of the sheet base material, as a folding position. Accordingly, the electric wire bundle can be covered with the sheet base material via an easy and short time operation, in a state of being interposed between the portions of the sheet base material.

(3) The wire harness sheet according to the (1) configuration, wherein
the placement region is provided proximate to the first side portion, and
the slit is cut into the sheet base material from only the second side portion.

In the wire harness sheet with the (3) configuration, the preliminary fixing sheet piece portions and the main fixing sheet portion are wound in multiple layers around the center portion of the electric wire bundle that is placed along the first side portion of the sheet base material. Accordingly, the electric wire bundle can be covered with the sheet base material in such a manner that the same winding outer diameter is obtained.

(4) A wire harness comprising:
a sheet base material having a rectangular shape formed by a first side portion and a second side portion which are parallel with each other and by a third side portion and a fourth side portion which are orthogonal to the first side portion and the second side portion;
an adhesive layer provided on one surface of the sheet base material on which an electric wire bundle is placed in parallel with the first side portion and the second side portion;
a slit, cut into the sheet base material between at least one of the first side portion and the second side portion and a placement region of the electric wire bundle, provided proximate to the third side portion and the fourth side portion respectively, and formed along the third side portion and the fourth side portion respectively; and
the electric wire bundle provided on the one surface of the sheet base material.

In the wire harness with the (4) configuration, the pair of preliminary fixing sheet piece portions of the sheet base material is fixed to both side portions of the linearly stretched electric wire bundle, and the unwrinkled sheet base material is located relative to the electric wire bundle which is not loose. In a state where the sheet base material is located with respect to the electric wire bundle, the main fixing sheet portion is wound around a center portion of the electric wire bundle, and thus it is possible to locate and fix the sheet base material at an exact position with respect to the linear electric wire bundle. In addition, it is possible to manufacture the uniform wire harness with good appearance at a low cost.

(5) A method of manufacturing a wire harness, in which a wire harness sheet is used,
the wire harness sheet including:
a sheet base material having a rectangular shape formed by a first side portion and a second side portion which are parallel with each other and by a third side portion and a fourth side portion which are orthogonal to the first side portion and the second side portion;
an adhesive layer provided on one surface of the sheet base material on which an electric wire bundle is placed in parallel with the first side portion and the second side portion; and
a slit, cut into the sheet base material between at least one of the first side portion and the second side portion and a placement region of the electric wire bundle, provided proximate to the third side portion and the fourth side portion respectively, and formed along the third side portion and the fourth side portion respectively,
the method comprising:
a step of placing the electric wire bundle on the one surface of the sheet base material;

a step of fixing a pair of preliminary fixing sheet piece portions which are formed on outer sides of the slits of the sheet base material to the electric wire bundle by the adhesive layer; and a step of fixing a main fixing sheet portion which is provided between the pair of preliminary fixing sheet piece portions to the electric wire bundle by the adhesive layer after the preliminary fixing sheet piece portions are fixed to the electric wire bundle.

In the method of manufacturing the wire harness with the (5) configuration, the pair of preliminary fixing sheet piece portions provided in both side portions of the sheet base material is fixed to both side portions of the linearly stretched electric wire bundle, and thus the sheet base material is located with respect to the unbent electric wire bundle. In this state, the main fixing sheet portion interposed between the pair of preliminary fixing sheet piece portions is fixed to the electric wire bundle between the preliminary fixing sheet piece portions, and thus the main fixing sheet portion is fixed to the electric wire bundle at an exact position. That is, the preliminary fixing sheet piece portion functions as fixing means for preventing the occurrence of a positional deviation. On some occasions, after the preliminary fixing sheet piece portions are fixed to the linear electric wire bundle, the electric wire bundle may bend, and the sheet base material may wrinkle. Even in this case, when the electric wire bundle is linearly stretched again, the sheet base material is re-located to follow the electric wire bundle. For this reason, it is possible to fix the main fixing sheet portion to the electric wire bundle at an exact position.

The second object of the present invention is achieved with the following configurations (6) to (10).

(6) A wire harness sheet includes:

a sheet base material having a rectangular shape formed by a first side portion and a second side portion which are parallel with each other and by a third side portion and a fourth side portion which are orthogonal to the first side portion and the second side portion, provided with an adhesive layer formed on one surface of the sheet base material, and bonded to itself by folded back or by overlapped, so as to adhesively fix an electric wire bundle in parallel with the first side portion by sandwiching the electric wire bundle with a sandwiching portion separated from the first side portion;

a slit cut into a bonding portion between a bonding end of the first side portion and the sandwiching portion; and a circular rip-stopping portion formed at an end of the slit which is positioned in the sandwiching portion.

In the wire harness sheet with the (6) configuration, when the sheet base material is bonded to itself by folding the sheet base material, or by overlapping the sheet base materials, the electric wire bundle in parallel with the first side portion is adhesively fixed to the sandwiching portion separated from the first side portion, in a state of being interposed in the sandwiching portion. The slit is disposed in the bonding portion between the bonding end of the first side portion and the sandwiching portion. Since the slit formed in the bonding portion is open at the bonding end, the electric wire bundle adhesively fixed to the sandwiching portion can be bent to an opposite side of the slit. Since the sheet base material has a rectangular shape, the sheet base material can be manufactured at a low cost, and is easy to handle (easy to store or transport).

(7) The wire harness sheet according to the (6) configuration, wherein the sheet base material is made of a single piece and is folded back and adhesively fixed to itself.

In the wire harness sheet with the (7) configuration, a piece of the sheet base material is folded in half and bonded to itself, having the position of the electric wire bundle, which is placed at a center portion of the sheet base material, as a folding position. Accordingly, the electric wire bundle can be covered with the sheet base material via an easy and short time operation, in a state of being interposed between the portions of the sheet base material. Since it is possible to fold back a piece of the sheet base material, in a state of the electric wire bundle being placed at an end, it is possible to reduce a bonding margin of the sheet base material compared to a case in which two pieces of the sheet base materials are bonded together, and reduce the area of the entire sheet base material.

(8) The wire harness sheet according to the (6) configuration, wherein the sheet base material is made of two pieces which are overlapped each other and adhesively fixed together.

In the wire harness sheet with the (8) configuration, the sheet base materials are bonded together by placing the electric wire bundle close to the second side portion that is separated from the first side portion of one of the two pieces of sheet base materials, and by overlapping one sheet base material with the other sheet base material. Accordingly, the electric wire bundle can be covered with the sheet base materials via an easy and short time operation, in a state of being interposed between the sheet base materials. Two pieces of sheet base materials are used, and thus the size of the sheet base material is made smaller compared to the case in which a piece of the sheet base material is used. The wire harness sheet can be easy to store or handle.

(9) A wire harness comprising:

a sheet base material having a rectangular shape formed by a first side portion and a second side portion which are parallel with each other and by a third side portion and a fourth side portion which are orthogonal to the first side portion and the second side portion, provided with an adhesive layer formed on one surface of the sheet base material, and bonded to itself by folded back or by overlapped, so as to adhesively fix an electric wire bundle in parallel with the first side portion by sandwiching the electric wire bundle with a sandwiching portion separated from the first side portion;

a slit cut into a bonding portion between a bonding end of the first side portion and the sandwiching portion; and a circular rip-stopping portion formed at an end of the slit, which is positioned in the sandwiching portion; and the electric wire bundle provided on the one surface of the sheet base material, wherein the electric wire bundle is adhesively fixed to the sandwiching portion by folding back the sheet base material or by overlapping the sheet base materials.

In the wire harness with the (9) configuration, the linearly stretched electric wire bundle is fixed to the sandwiching portion. Since the slit provided in the bonding portion is open at the bonding end, the electric wire bundle adhesively fixed to the sandwiching portion can be bent to the opposite side of the slit. Accordingly, the electric wire bundle can be routed along a predetermined bending path. The slit open in the bonding portion is prevented from further tearing off by the rip-stopping portion formed at the end of the slit. Since it is not necessary to cut the flat-shaped sheet base material by using a mold after the bending is completed, it is possible to obtain a good yield rate, and reduce material costs.

(10) A method of manufacturing a wire harness, in which a wire harness sheet is used, the wire harness sheet including:

a sheet base material having a rectangular shape formed by a first side portion and a second side portion which are parallel with each other and by a third side portion and a fourth side portion which are orthogonal to the first side portion and a second side portion, provided with an adhesive layer formed on one surface of the sheet base material, and bonded to itself by folded back or by overlapped, so as to adhesively fix an electric wire bundle in parallel with the first side portion by sandwiching the electric wire bundle with a sandwiching portion separated from the first side portion;

a slit cut into a bonding portion between a bonding end of the first side portion and the sandwiching portion; and a circular rip-stopping portion formed at an end of the slit which is positioned in the sandwiching portion, the method comprising:

a step of adhesively fixing the electric wire bundle to the sandwiching portion by folding back the sheet base material or by overlapping the sheet base materials, while the slits and the rip-stopping portions being respectively aligned with each other.

In the method of manufacturing the wire harness with the (10) configuration, a piece of the sheet base material is folded back in half and bonded to itself, having the position of the electric wire bundle, which is linearly placed in a center portion of the sheet base material, as a folding position. Accordingly, the electric wire bundle can be easily covered with the sheet base material, in a state of being interposed between the portions of the sheet base material. The sheet base materials are bonded together by linearly placing the electric wire bundle close to the second side portion that is separated from the first side portion of one of the two pieces of sheet base materials, and by overlapping one sheet base material with the other sheet base material. Accordingly, the electric wire bundle can be easily covered with the sheet base material, in a state of being interposed between the portions of the sheet base material. Since the sheet base material has a rectangular shape, the bonding operation can be simply performed. It is not necessary to locate and fix the electric wire bundle while bending the electric wire bundle along the bending shaped sheet base material as in the related art, and thus a skill is not required and the bonding operation is easily performed.

The present invention has been simply described above. When forms for the implementation of the present invention (hereinafter, referred to as an "embodiment"), which will be described later, are read through with reference to the accompanying drawings, the details of the present invention will become further apparent.

DESCRIPTION OF EMBODIMENTS

Hereinafter, embodiments of the present invention will be described with reference to the accompanying drawings.

Figure 1:
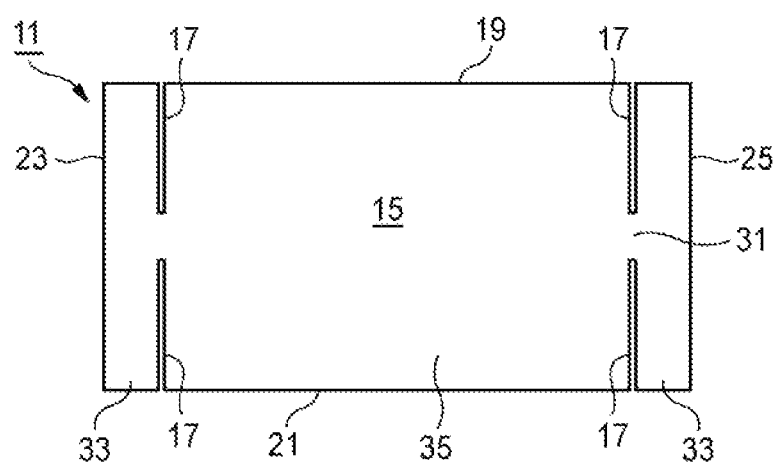
FIG. 1 is a plan view of a wire harness sheet according to a first embodiment of the present invention.

FIG. 1 is a plan view of a wire harness sheet according to a first embodiment of the present invention.

A wire harness sheet 11 according to the first embodiment is configured to mainly include a sheet base material 13, an adhesive layer 15 (refer to FIG. 3), and slits 17. The sheet base material 13 has a rectangular shape that is formed by a pair of first side portion 19 and second side portion 21 in parallel with each other, and by a third side portion 23 and a fourth side portion 25 orthogonal to the first side portion 19 and the second side portion 21. The sheet base material 13 can be made of plastic materials, for example, well-known polyolefin resin such as polyethylene and polypropylene, polyurethane resin, polystyrene resin, acrylic resin, polyvinyl chloride resin, and polycarbonate resin.

The adhesive layer 15 is formed on one surface of the sheet base material 13, and an electric wire bundle 27 (refer to FIG. 2) is placed on the sheet base material 13 so as to be in parallel with the first side portion 19 and the second side portion 21. The electric wire bundle 27 bundles a plurality of coated electric wires 29 (refer to FIG. 3), and has a linear shape. The adhesive layer 15 is formed on the entire surface or a part of the surface on which the electric wire bundle 27 is placed. Various well-known adhesives such as an acrylic based adhesive, a rubber based adhesive, or a silicone based adhesive can be used so as to form the adhesive layer 15.

The slits 17 are provided proximate to the third side portion 23 and the fourth side portion 25. The slit 17 is cut into the sheet base material 13 in such a manner that the slit 17 is formed between at least one of the first side portion 19 and the second side portion 21 and a placement region 31 of the electric wire bundle 27, and that the slit 17 lies along and in parallel with the third side portion 23 and the fourth side portion 25. The placement region 31 is provided in the wire harness sheet 11 according the first embodiment, so as to be equidistant from the first side portion 19 and the second side portion 21. A pair of the slits 17 is cut into the sheet base material 13 in such a manner that the slits 17 are formed between both the first side portion 19 and the second side portion 21, and the placement region 31, respectively. Accordingly, the slit 17 is not formed in the placement region 31. In the accompanying drawings, the slit 17 is illustrated as having a gap for illustrative purposes. However, in practicality, the slit 17 is cut into the sheet base material 13, and thus the gap is not formed. Certainly, it is possible to form the slit having the gap as illustrated.

In the wire harness sheet 11 of the first embodiment, preliminary fixing sheet piece portions 33 are respectively formed on right and left outer sides of the slits 17, and a main fixing sheet portion 35 is formed on a right or left inner side of the slit 17 interposed between a pair of the preliminary fixing sheet piece portion 33. That is, since the wire harness sheet 11 is provided with the slit 17, the preliminary fixing sheet piece portions 33 having a degree of freedom are respectively formed in right and left portions of the wire harness sheet 11. The slits 17 may not only be provided in the right and left portions of the wire harness sheet 11, but may also be provided in either the right or left portion.

Subsequently, a method of manufacturing a wire harness 37 with the wire harness sheet 11 according to the first embodiment will be described.

Figure 2:
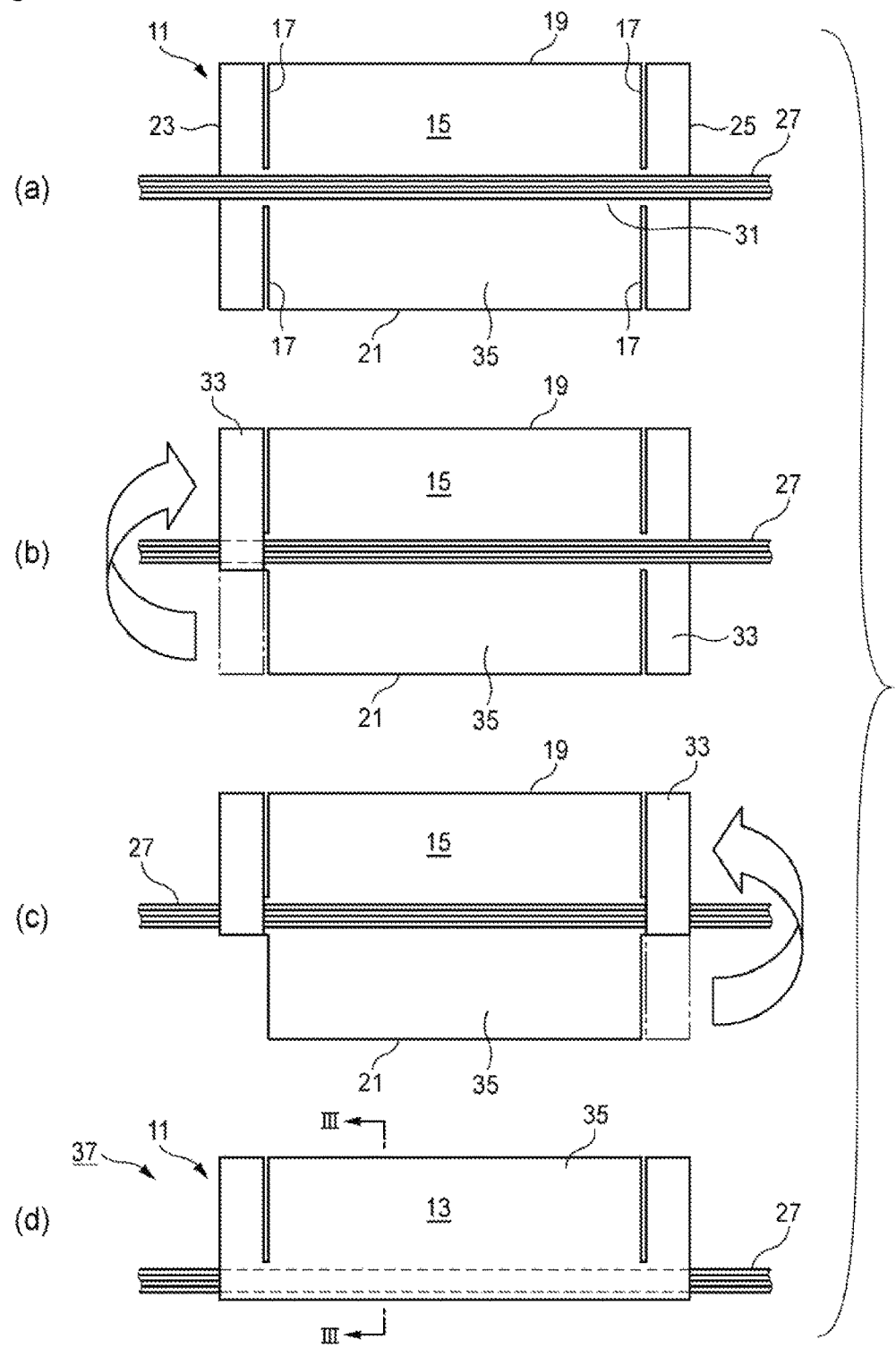
FIG. 2 is a process view describing a method of manufacturing a wire harness with the wire harness sheet illustrated in FIG. 1 according to procedures (a) to (d).
Figure 3:
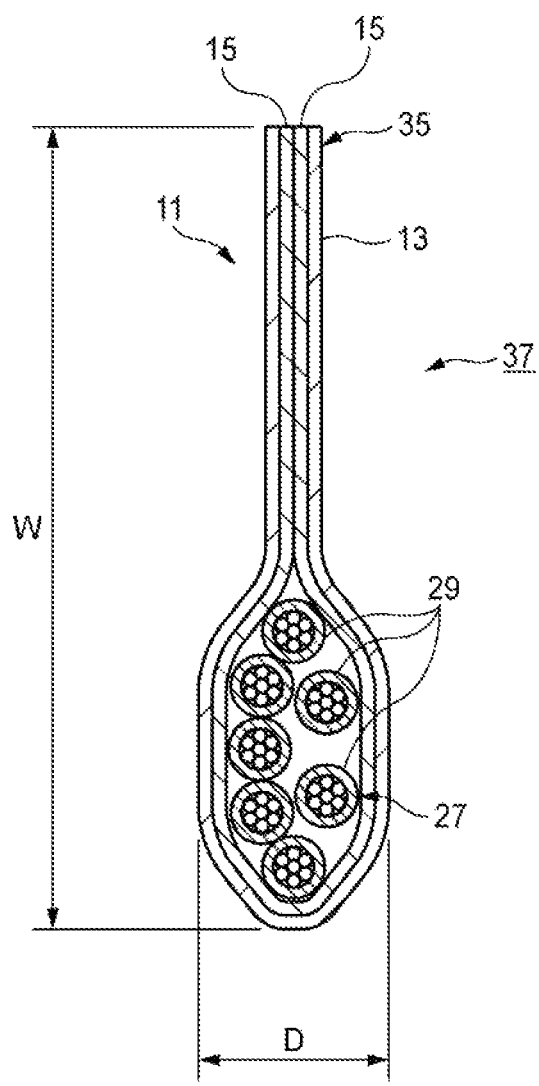
FIG. 3 is a cross-sectional view taken along line III-III in FIG. 2(d).

FIG. 2 is a process view describing the method of manufacturing the wire harness with the wire harness sheet illustrated in FIG. 1 according to procedures (a) to (d). FIG. 3 is a cross-sectional view taken along line III-III in FIG. 2(d).

First, as illustrated in FIG. 2(a), the electric wire bundle 27 is set on the adhesive layer 15 of the wire harness sheet 11. At this time, the electric wire bundle 27 is positioned at the center (that is, the placement region 31) of the sheet base material 13. The electric wire bundle 27 is stretched with pins so that the electric wire bundle 27 is not loose.

Subsequently, as illustrated in FIG. 2(b), one (the left one in the first embodiment) of the right and left preliminary fixing sheet piece portions 33 is folded in half in such a manner that a portion of the one preliminary fixing sheet piece portion 33 overlaps an opposite portion thereof, sandwiching the electric wire bundle 27 therebetween. The one preliminary fixing sheet piece portion 33 is adhesively fixed to the electric wire bundle 27.

Subsequently, as illustrated in FIG. 2(c), the other (the right one in the first embodiment) of the right and left preliminary fixing sheet piece portions 33 is folded in half in such a manner that a portion of the other preliminary fixing sheet piece portion 33 overlaps an opposite portion thereof, sandwiching the electric wire bundle 27 therebetween. The other remaining preliminary fixing sheet piece portion 33 is adhesively fixed to the electric wire bundle 27. At this time, in a state where the electric wire bundle 27 is not loose, the other remaining preliminary fixing sheet piece portion 33 is fixed to the electric wire bundle 27.

Finally, as illustrated in FIG. 2(d), the remaining main fixing sheet portion 35 is folded in half in such a manner that a portion of the main fixing sheet portion 35 overlaps an opposite portion thereof, sandwiching the electric wire bundle 27 therebetween. The main fixing sheet portion 35 is adhesively fixed to the electric wire bundle 27. Accordingly, the manufacturing of the wire harness 37 having the electric wire bundle 27 covered with the wire harness sheet 11 is completed.

That is, the method of manufacturing the wire harness according to the first embodiment includes a step in which the electric wire bundle 27 is placed on one surface of the sheet base material 13 of the wire harness sheet 11; a step in which the pair of preliminary fixing sheet piece portions 33 formed on the outer sides of the slits 17 of the sheet base material 13 is fixed to the electric wire bundle 27 via the adhesive layer 15; and a step in which the main sheet portion 35 interposed between the pair of preliminary fixing sheet piece portions 33 is fixed to the electric wire bundle 27 via the adhesive layer 15, after the preliminary fixing sheet piece portion 33 is fixed to the electric wire bundle 27.

The pair of preliminary fixing sheet piece portions 33 provided in both side portions of the sheet base material 13 is fixed to both side portions of the linearly stretched electric wire bundle 27, and thus the sheet base material 13 is located with respect to the unbent electric wire bundle 27. In this state, the main fixing sheet portion 35 interposed between the pair of preliminary fixing sheet piece portions 33 is fixed to the electric wire bundle 27 between the preliminary fixing sheet piece portions 33, and thus the main fixing sheet portion 35 is fixed to the electric wire bundle 27 at an exact position. That is, the preliminary fixing sheet piece portion 33 functions as fixing means for preventing the occurrence of a positional deviation. On some occasions, after the preliminary fixing sheet piece portions 33 are fixed to the linear electric wire bundle 27, the electric wire bundle 27 may bend, and the sheet base material 13 may wrinkle. Even in this case, when the electric wire bundle 27 is linearly stretched again, the sheet base material 13 is re-located to follow the electric wire bundle 27. For this reason, it is possible to fix the main fixing sheet portion 35 to the electric wire bundle 27 at an exact position.

In the wire harness sheet 11 of the first embodiment, the linearly stretched electric wire bundle 27 is placed in the placement region 31 of the sheet base material 13. In addition, the sheet base material 13 is fixed to the electric wire bundle 27 by the pair of preliminary fixing sheet piece portions 33 in which ends of the placement region 31 are formed on the outer sides of the slits 17. Both the side portions of the flat-shaped sheet base material 13 are fixed to both the side portions of the linear electric wire bundle 27, and the sheet base material 13 is fixed to the electric wire bundle 27, in a state of lying along the linear electric wire bundle 27. In this state, when the main fixing sheet portion 35 interposed between the pair of preliminary fixing sheet piece portions 33 is bonded to the electric wire bundle 27, the main fixing sheet portion 35 is fixed to the electric wire bundle 27 at an exact position. The reason is because the sheet base material 13 is located with respect to the electric wire bundle 27 by the preliminary fixing sheet piece portion 33. When the sheet base material 13 is fixed to the electric wire bundle 27, the preliminary fixing sheet piece portion 33 and the main fixing sheet portion 35 have the same width W or the same diameter D. Furthermore, the sheet base material 13 has a rectangular shape, and thus the sheet base material 13 can be manufactured at a low cost, and is easy to handle (easy to store or transport).

Furthermore, in the wire harness 37 according to the first embodiment, the sheet base material 13 is folded in half and bonded to itself, having the position of the electric wire bundle 27, which is placed at a center portion of the sheet base material 13, as a folding position. Accordingly, the electric wire bundle 27 can be covered with the sheet base material 13 via an easy and short time operation, in a state of being interposed between the portions of the sheet base material 13.

Subsequently, a modification example according to the first embodiment of the present invention will be described.

Figure 4:
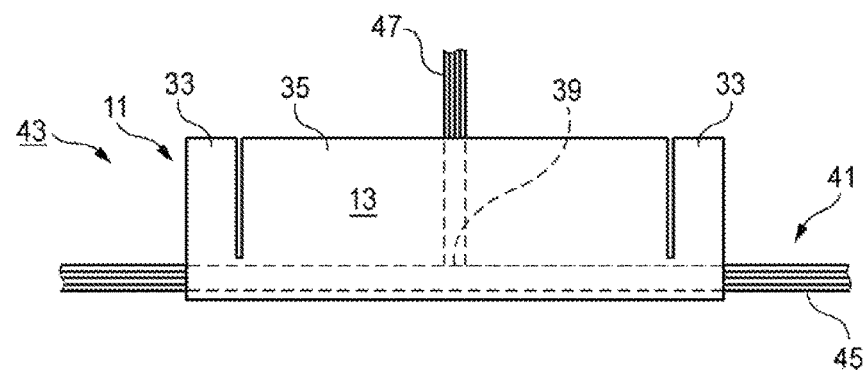
FIG. 4 is a plan view of a branched wire harness according to a modification example in which a branched electric wire bundle having a T-shaped branched portion is covered with the wire harness sheet illustrated in FIG. 1.

FIG. 4 is a plan view of a branched wire harness 43 according to the modification example in which a branched electric wire bundle 41 having a T-shaped branched portion 39 is covered with the wire harness sheet 11 illustrated in FIG. 1.

The wire harness sheet 11 according to the first embodiment can be suitably used so as to protect the branched electric wire bundle 41 in which a branch wire 47 branches off from a main wire 45, for example, the branched electric wire bundle 41 having the T-shaped branched portion 39. That is, the wire harness sheet 11 can be applied to both the linear electric wire bundle 27 and the branched electric wire bundle 41.

The branched electric wire bundle 41 is placed on the sheet base material 13 in such a manner that the main wire 45 is placed in the placement region 31, and the branch wire 47 is placed on a part of the main fixing sheet portion 35. Similar to the electric wire bundle 27 described above, each of the right and left preliminary fixing piece portions 33 is folded in half in such a manner that the part of the folding preliminary fixing sheet piece portion 33 overlaps an opposite part thereof, sandwiching the main wire 45 therebetween. The preliminary fixing sheet piece portions 33 are adhesively fixed to the main wire 45.

Finally, the remaining main fixing sheet portion 35 is folded in half in such a manner that the branched portion 39 is interposed between portions of the main fixing sheet portion 35, and a portion of the main fixing sheet portion 35 overlaps an opposite portion thereof, sandwiching the main wire 45 therebetween. The main fixing sheet portion 35 is adhesively fixed to the branched electric wire bundle 41. Accordingly, the manufacturing of the branched wire harness 43 covered with the wire harness sheet 11 is completed.

Figure 5:
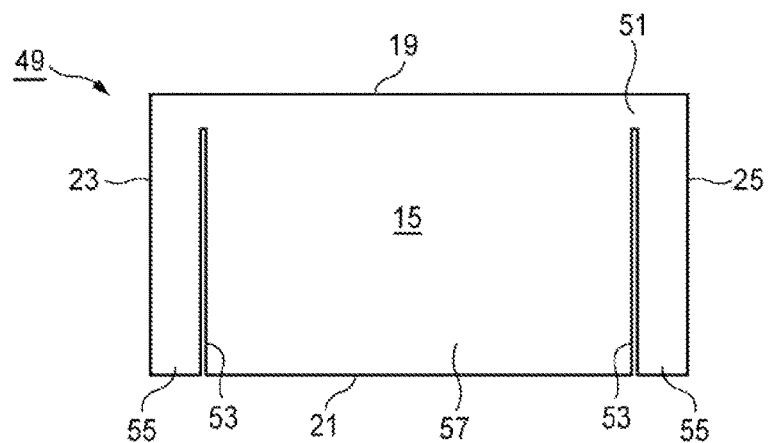
FIG. 5 is a plan view of a wire harness sheet according to a second embodiment of the present invention.

FIG. 5 is a plan view of a wire harness sheet 49 according to a second embodiment of the present invention. The same reference numbers are assigned to the same members and portions as those of the wire harness sheet 11 according to the first embodiment illustrated in FIGS. 1 to 3, and the descriptions thereof will be omitted.

In the wire harness sheet 49 according to the second embodiment, a placement region 51 is provided in the sheet base material 13, in a state of being proximate to the first side portion 19. A pair of slits 53 is cut into the sheet base material 13, the formation of the slit 53 starting only from the second side portion 21. The slit 53 is not formed in the placement region 51.

In the wire harness sheet 49 of the second embodiment, preliminary fixing sheet piece portions 55 are respectively formed on right and left outer sides of the slits 53, and a main fixing sheet portion 57 is formed on a right or left inner side of the slit 53 interposed between a pair of the preliminary fixing sheet piece portion 55. That is, since the wire harness sheet 49 is provided with the slit 53, the preliminary fixing sheet piece portions 55 having a degree of freedom are respectively formed in right and left portions of the wire harness sheet 49. The slits 53 may not only be provided in the right and left portions of the wire harness sheet 49, but may also be provided in either the right or left portion.

Subsequently, a method of manufacturing a wire harness 59 with the wire harness sheet 49 according to the second embodiment will be described.

Figure 6:
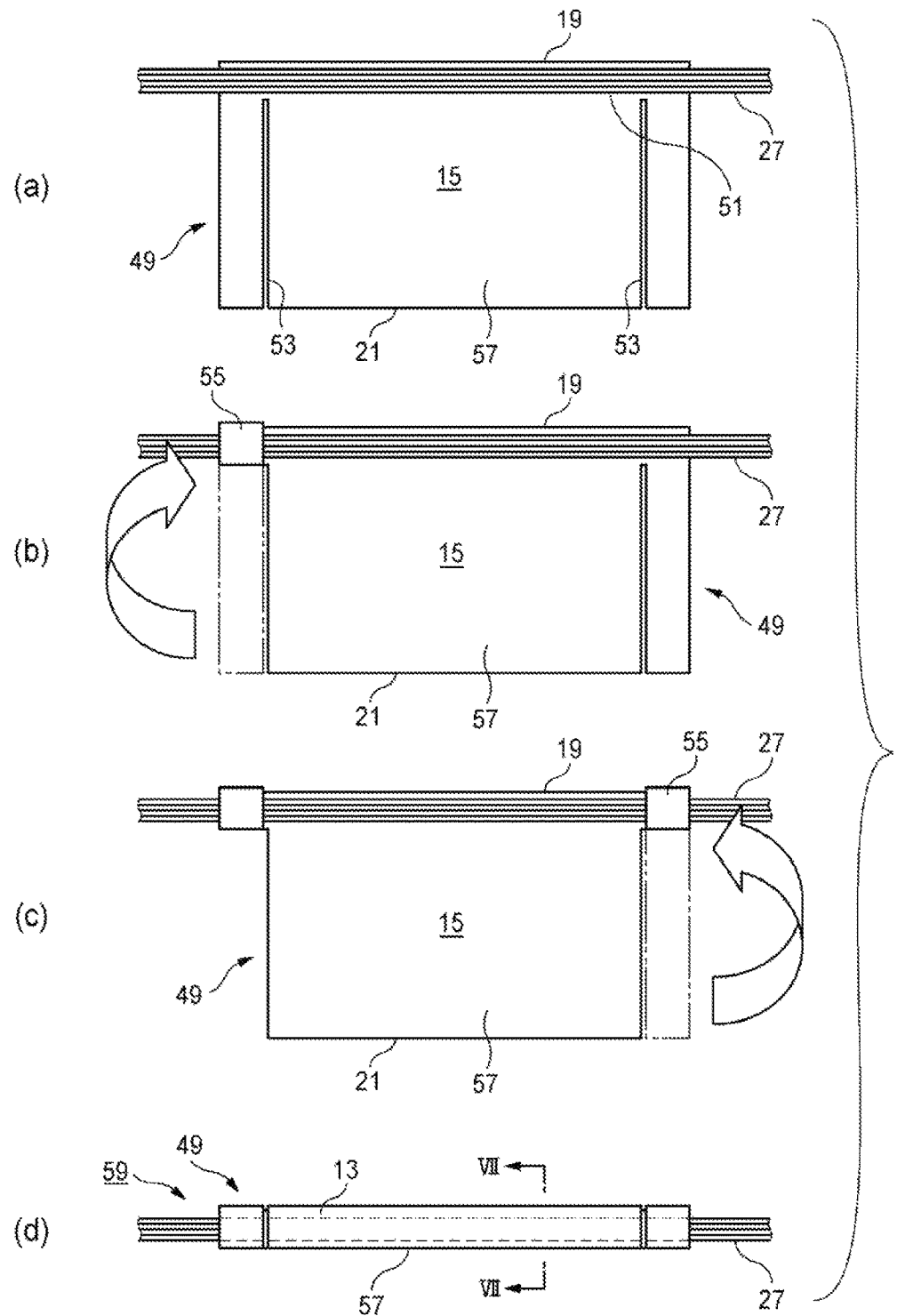
FIG. 6 is a process view describing a method of manufacturing a wire harness with the wire harness sheet illustrated in FIG. 5 according to procedures (a) to (d).
Figure 7:
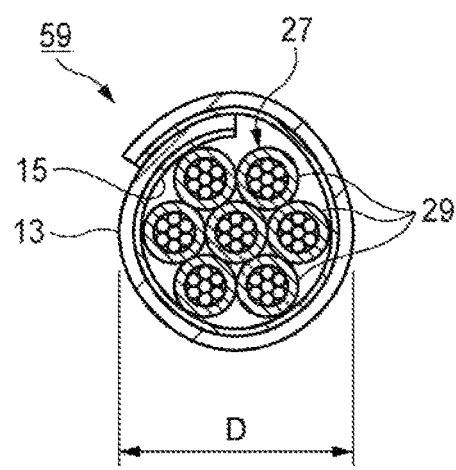
FIG. 7 is a cross-sectional view taken along line VII-VII in FIG. 6(d).

FIG. 6 is a process view describing the method of manufacturing the wire harness 59 with the wire harness sheet 49 illustrated in FIG. 5 according to procedures (a) to (d). FIG. 7 is a cross-sectional view taken along line VII-VII in FIG. 6(d).

First, as illustrated in FIG. 6(a), the electric wire bundle 27 is set on the adhesive layer 15 (refer to FIG. 7) of the wire harness sheet 49. At this time, the electric wire bundle 27 is positioned in the vicinity (that is, the placement region 51) of the first side portion 19 of the sheet base material 13. The electric wire bundle 27 is stretched with pins so that the electric wire bundle 27 is not loose.

Subsequently, as illustrated in FIG. 6(b), one (the left one in the second embodiment) of the right and left preliminary fixing sheet piece portions 55 is wound in multiple layers around the electric wire bundle 27. The one preliminary fixing sheet piece portion 55 is adhesively fixed to the electric wire bundle 27.

Subsequently, as illustrated in FIG. 6(c), the other (the right one in the second embodiment) of the right and left preliminary fixing sheet piece portions 55 is wound in multiple layers around the electric wire bundle 27. The other remaining preliminary fixing sheet piece portion 55 is adhesively fixed to the electric wire bundle 27. At this time, in a state where the electric wire bundle 27 is not loose, the other remaining preliminary fixing sheet piece portion 55 is fixed to the electric wire bundle 27.

Finally, as illustrated in FIG. 6(d), the remaining main fixing sheet portion 57 is wound in multiple layers around the electric wire bundle 27, and the main fixing sheet portion 57 is adhesively fixed to the electric wire bundle 27. Accordingly, the manufacturing of the wire harness 59 having the electric wire bundle 27 covered with the wire harness sheet 49 is completed.

In the wire harness 59 according to the second embodiment, the preliminary fixing sheet piece portions 55 and the main fixing sheet portion 57 are wound in multiple layers around the electric wire bundle 27 that is placed along the first side portion 19 of the sheet base material 13. Accordingly, the electric wire bundle 27 can be covered with the sheet base material 13 in such a manner that the same winding outer diameter D is obtained.

In the wire harness 37 (59) manufactured in this manner, the pair of preliminary fixing sheet piece portions 33 (55) formed on the outer sides of the slits 17 (53) of the sheet base material 13 is fixed to the electric wire bundle 27 via the adhesive layer 15. Thereafter, the main fixing sheet portion 35 (57) interposed between the pair of preliminary fixing sheet piece portions 33 (55) are fixed to the electric wire bundle 27 via the adhesive layer 15. For this reason, the pair of preliminary fixing sheet piece portions 33 (55) of the sheet base material 13 is fixed to both side portions of the linearly stretched electric wire bundle 27, and the unwrinkled sheet base material 13 is located relative to the electric wire bundle 27 which is not loose. In a state where the sheet base material 13 is located with respect to the electric wire bundle 27, the main fixing sheet portion 35 (57) is wound around a center portion of the electric wire bundle 27, and thus it is possible to locate and fix the sheet base material 13 at an exact position with respect to the linear electric wire bundle 27. In addition, it is possible to manufacture the uniform wire harness 37 (59) with good appearance at a low cost.

In the wire harness sheet 11 (49), the wire harness 37 (59), and the method of manufacturing the wire harness 37 (59) according to the first and second embodiments, it is possible to manually fix the electric wire bundle 27 at an exact position without using special machine and bending an electric wire bundle 27.

Figure 8:
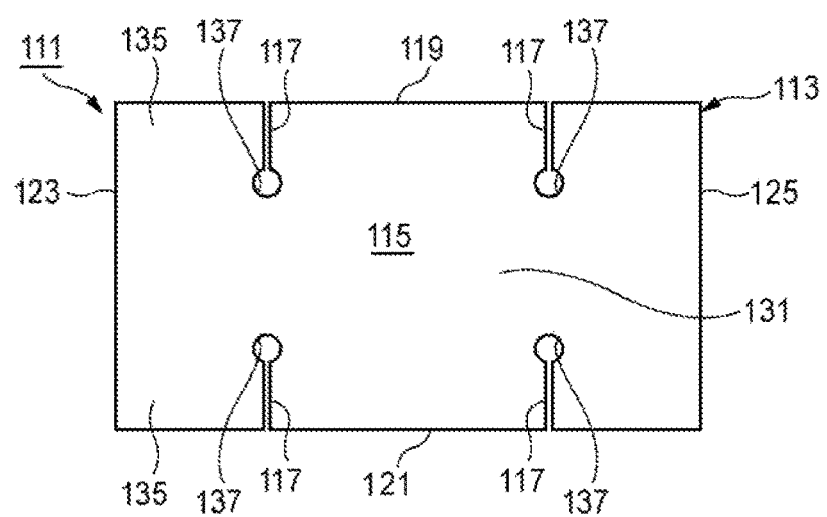
FIG. 8 is a plan view of a wire harness sheet according to a third embodiment of the present invention.

FIG. 8 is a plan view of a wire harness sheet according to a third embodiment of the present invention.

A wire harness sheet 111 according to the third embodiment is configured to mainly include a sheet base material 113, an adhesive layer 115 (refer to FIG. 10), and slits 117. The sheet base material 113 has a rectangular shape that is formed by a pair of first side portion 119 and second side portion 121 in parallel with each other, and by a third side portion 123 and a fourth side portion 125 orthogonal to the first side portion 119 and the second side portion 121. Similar to the sheet base material 13, the sheet base material 113 can be made of plastic materials, for example, well-known polyolefin resin such as polyethylene and polypropylene, polyurethane resin, polystyrene resin, acrylic resin, polyvinyl chloride resin, and polycarbonate resin.

The adhesive layer 115 is formed on one surface of the sheet base material 113, and an electric wire bundle 127 (refer to FIG. 9(a)) is placed on the adhesive layer 115 so as to be in parallel with the first side portion 119 and the second side portion 121. The electric wire bundle 127 bundles a plurality of coated electric wires 129 (refer to FIG. 10), and has a linear shape. The adhesive layer 115 is formed on the entire surface or a part of the surface on which the electric wire bundle 127 is placed. Various well-known adhesives such as an acrylic based adhesive, a rubber based adhesive, or a silicone based adhesive can be used so as to form the adhesive layer 115.

In the third embodiment, the sheet base material 113 is folded back and bonded to itself. The electric wire bundle 127 in parallel with the first side portion 119 is adhesively fixed to the sheet base material 113, in a state of being interposed in a sandwiching portion 131 (refer to FIG. 9(b)) separated from the first side portion 119. The slit 117 is cut into the sheet base material 113 in such a manner that the slit 117 is formed in a bonding portion 135 (refer to FIG. 9(b)) between a bonding end 133 of the first side portion 119 and the sandwiching portion 131, and that the slit 117 is orthogonal to the electric wire bundle 127. In the third embodiment, the sandwiching portion 131 is provided in a center portion of the sheet base material 113. Accordingly, as illustrated in FIG. 8, the slits 117 are cut into the unfolded sheet base material 113, the formation of the slit 117 starting from both the first side portion 119 and the second side portion 121. In the accompanying drawings, the slit 117 is illustrated as having a gap for illustrative purposes. However, in practicality, the slit 117 is cut into the sheet base material 113, and thus the gap is not formed. Certainly, it is possible to form the slit having the gap as illustrated.

It is possible to arbitrarily determine the number of slits 117 which are cut into the sheet base material 113, and the formation of which starts from the first side portion 119 and the second side portion 121. When the number of the slits 117 is increased, it is possible to correspond the wire harness 139 to an arc having a smaller bend radius, and a curvature approximate to a curved line. In the third embodiment, a total of four slits 117 are formed, specifically, a pair of the slits 117 is respectively formed, the formation of the pair of slits 117 starting from the first side portion 119 and the second side portion 121. A circular rip-stopping portion 137 is formed at a end of the slit 117, which is positioned in the sandwiching portion 131. The rip-stopping portion 137 is an open C-shaped hole, and both ends are connected to both edge portions of the slits 117.

Subsequently, a method of manufacturing a wire harness 139 with the wire harness sheet 111 according to the third embodiment will be described.

Figure 9:
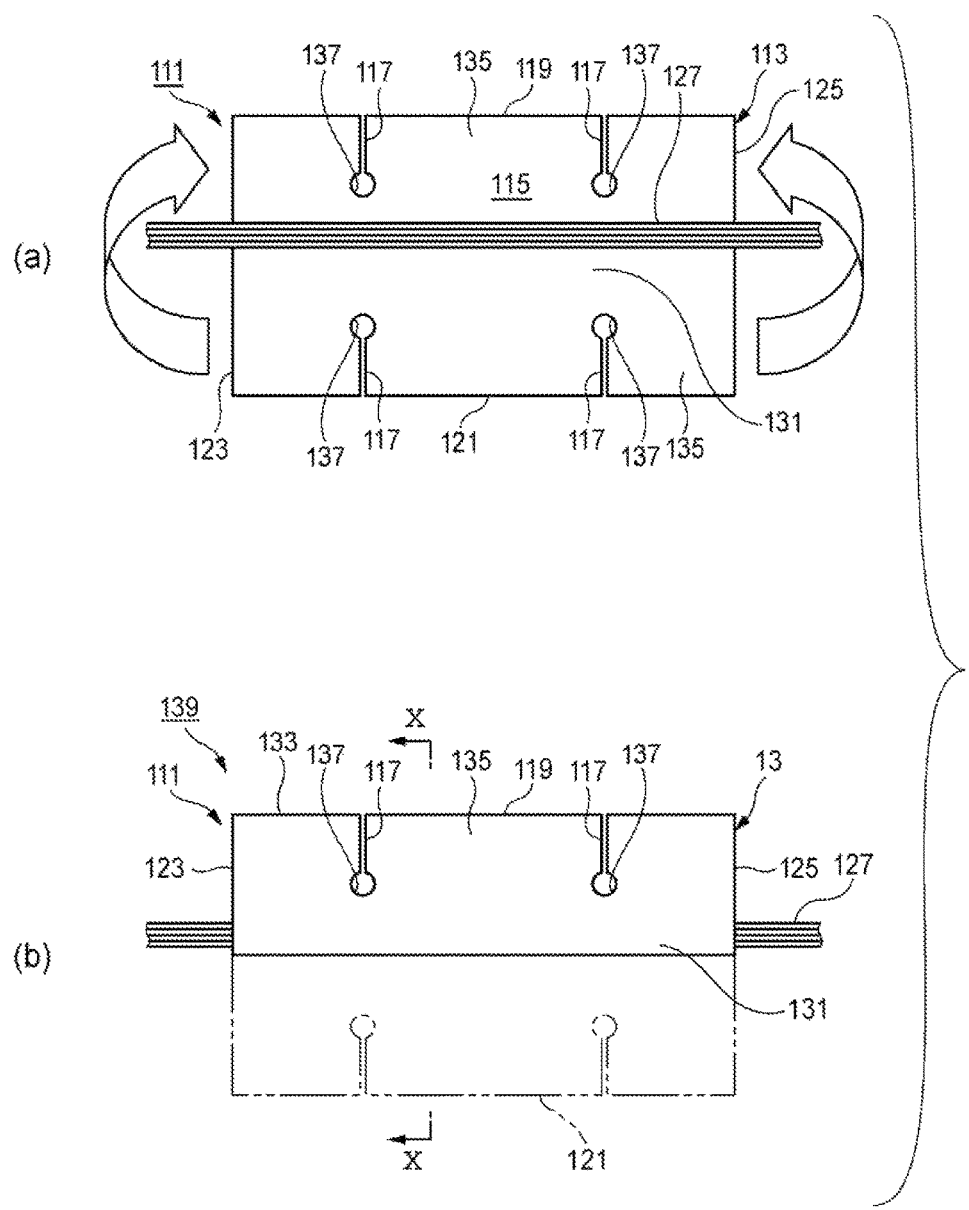
FIG. 9 is a process view describing a method of manufacturing a wire harness with the wire harness sheet illustrated in FIG. 8 according to procedures (a) and (b).
Figure 10:
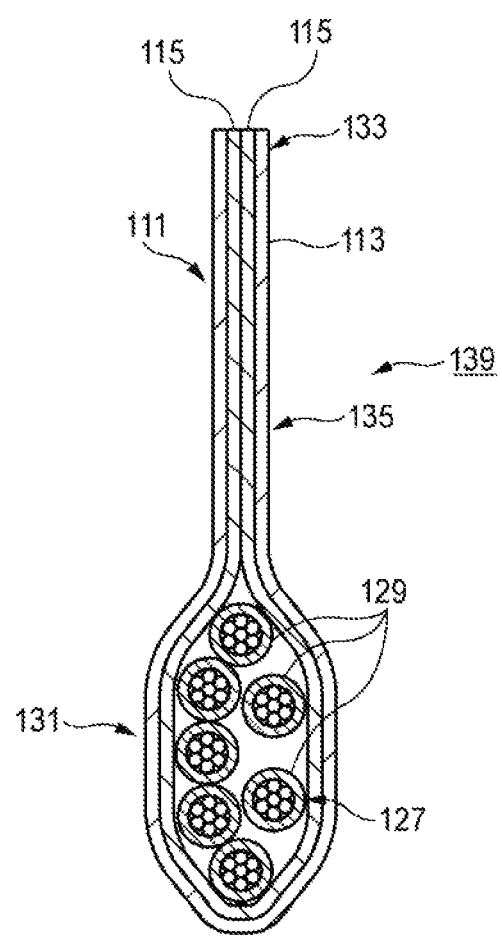
FIG. 10 is a cross-sectional view taken along line X-X in FIG. 9(b).

FIG. 9 is a process view describing the method of manufacturing the wire harness 139 with the wire harness sheet 111 illustrated in FIG. 8 according to procedures (a) and (b). FIG. 10 is a cross-sectional view taken along line X-X in FIG. 9(b).

First, as illustrated in FIG. 9(a), the linear electric wire bundle 127 is set on the adhesive layer 115 of the wire harness sheet 111. At this time, the electric wire bundle 127 is positioned at a center portion (that is, the sandwiching portion 131) of the wire harness sheet 111. The electric wire bundle 127 is stretched with pins so that the electric wire bundle 127 is not loose.

Subsequently, as illustrated in FIG. 9(b), the wire harness sheet 111 is folded back in half. At this time, the facing slits 117 and the facing rip-stopping portions 137 overlap each other, respectively, and the wire harness sheet 111 is adhesively fixed to the electric wire bundle 127. That is, the electric wire bundle 127 is adhesively fixed to the sandwiching portion 131 while the slits 117 and the rip-stopping portions 137 are respectively aligned with each other.

That is, in the method of manufacturing the wire harness according to the third embodiment, the electric wire bundle 127 is linearly placed in the center portion of a piece of the sheet base material 113, and the sheet base material 113 is folded back in half and bonded to itself, having the position of the electric wire bundle 127 as a folding position. Accordingly, the electric wire bundle 127 can be easily covered with the sheet base material 113, in a state of being interposed in the sandwiching portion 131. Since the sheet base material 113 has a rectangular shape, the bonding operation can be simply performed. It is not necessary to locate and fix the electric wire bundle 127 while bending the electric wire bundle 127 along the bending shaped sheet base material as in the related art, and thus a skill is not required and the bonding operation is easily performed.

In the wire harness sheet 11 of the third embodiment, when a piece of the sheet base material 113 is folded back and bonded to itself, the electric wire bundle 127 in parallel with the first side portion 119 is adhesively fixed to the sandwiching portion 131 separated from the first side portion 119, in a state of being interposed in the sandwiching portion 131. The slit 117, being cut into the sheet base material 113, is disposed in the bonding portion 135 between the bonding end 133 of the first side portion 119 and the sandwiching portion 131. Since the slit 117 formed in the bonding portion 135 is open at the bonding end 133, the electric wire bundle 127 adhesively fixed to the sandwiching portion 131 can be bent to an opposite side of the slit 117. Since the sheet base material 113 has a rectangular shape, the sheet base material 113 can be manufactured at a low cost, and is easy to handle (easy to store or transport). Furthermore, since it is possible to fold back a piece of the sheet base material 113, in a state of the electric wire bundle 127 being placed at an end, it is possible to reduce a bonding margin of the sheet base material 113 compared to a case in which two pieces of the sheet base materials are bonded together, and reduce the area of the entire sheet base material (refer to FIG. 14).

Figure 11:
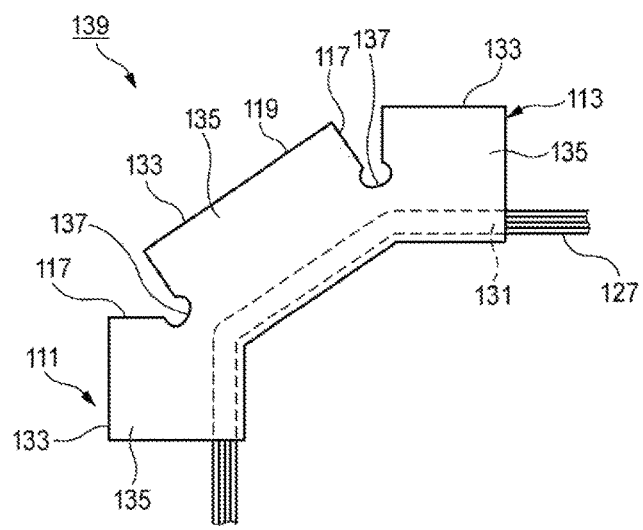
FIG. 11 is a plan view illustrating an example of how the wire harness illustrated in FIG. 9(b) is used.

FIG. 11 is a plan view illustrating an example of how the wire harness 139 illustrated in FIG. 9(b) is used.

In the wire harness 139 according to the third embodiment, a piece of the sheet base material 113 is folded back and bonded to itself, and the electric wire bundle 127 is adhesively fixed to the sandwiching portion 131. The linearly stretched electric wire bundle 127 is fixed to the sandwiching portion 131. Since the slit 117 provided in the bonding portion 135 is open at the bonding end 133, the electric wire bundle 127 adhesively fixed to the sandwiching portion 131 can be bent to the opposite side of the slit 117. Accordingly, the electric wire bundle 127 can be routed along a predetermined bending path. The slit 117 open in the bonding portion 135 is prevented from further tearing off by the rip-stopping portion 137 formed at the end of the slit 117. In the wire harness 139, since it is not necessary to cut the flat-shaped sheet base material 113 by using a mold after the bending is completed, it is possible to obtain a good yield rate, and reduce material costs.

Figure 12:
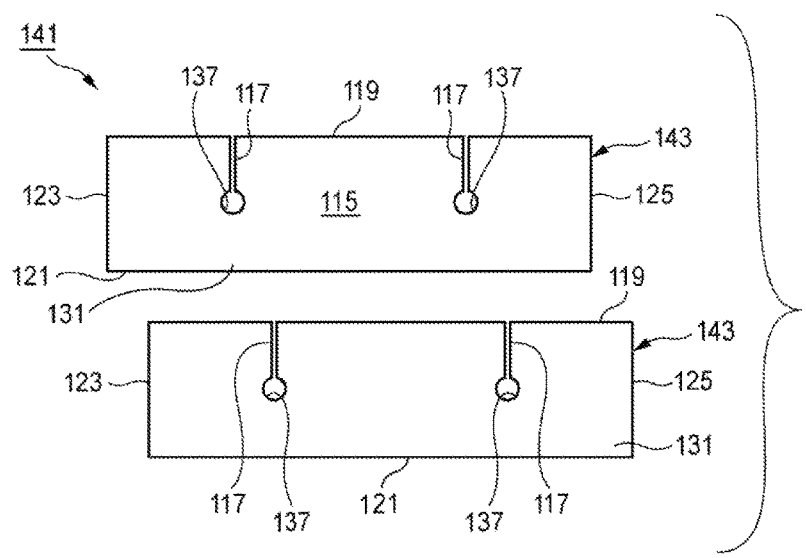
FIG. 12 is a plan view of a wire harness sheet according to a fourth embodiment of the present invention.

FIG. 12 is a plan view of a wire harness sheet 141 according to a fourth embodiment of the present invention. The same reference numbers are assigned to the same members and portions as those of the wire harness sheet 111 according to the third embodiment illustrated in FIGS. 8 to 11, and the descriptions thereof will be omitted.

In the wire harness sheet 141 according to the fourth embodiment, two pieces of sheet base materials 143 overlap each other, and thus are adhesively fixed together. Each of the sheet base materials 143 has a rectangular shape that is formed by the pair of first side portion 119 and second side portion 121 in parallel with each other, and by the third side portion 123 and the fourth side portion 125 orthogonal to the first side portion 119 and the second side portion 121. That is, the two pieces of sheet base materials 143 have the same shape, and the adhesive layer 115 (refer to FIG. 14) is provided on only one surface of the sheet base material 143, the one surface becoming a bonding surface of both the sheet base materials 143.

In the fourth embodiment, the sandwiching portion 131 separated from the first side portion 119 is provided in the vicinity of the second side portion 121 of the sheet base material 143. The linear electric wire bundle 127 (refer to FIG. 13) is disposed in, and adhesively fixed to the sandwiching portion 131. In each of the sheet base materials 143, the slit 117 is cut into the bonding portion 135 between the first side portion 119 and the sandwiching portion 131. In the fourth embodiment, the pair of slits 117 is formed in each of the sheet base materials 143. A circular rip-stopping portion 137 is formed at a end of the slit 117, which is positioned in the sandwiching portion 131.

Subsequently, a method of manufacturing a wire harness 145 with the wire harness sheet 141 according to the fourth embodiment will be described.

Figure 13:
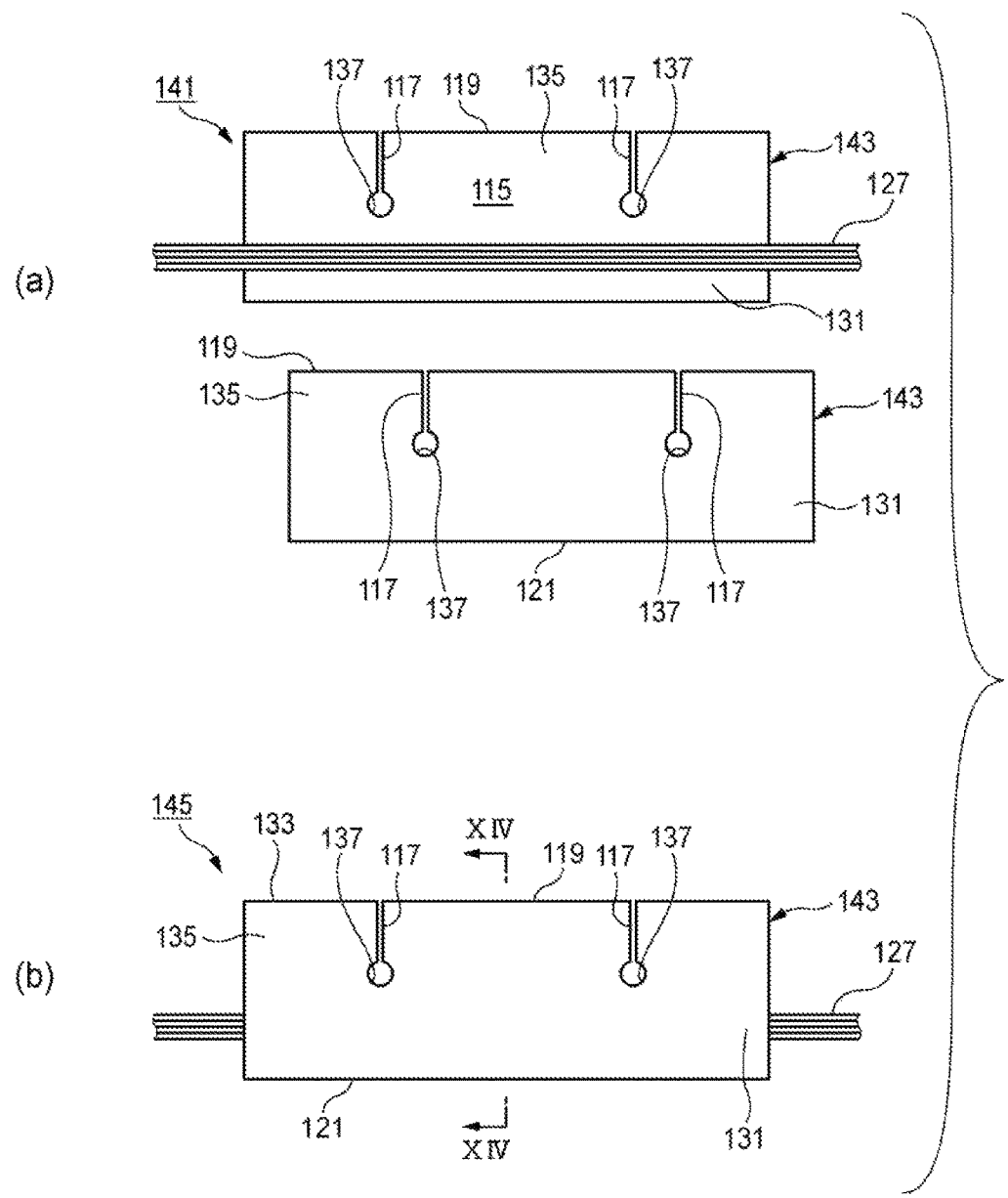
FIG. 13 is a process view describing a method of manufacturing a wire harness with the wire harness sheet illustrated in FIG. 12 according to procedures (a) and (b).
Figure 14:
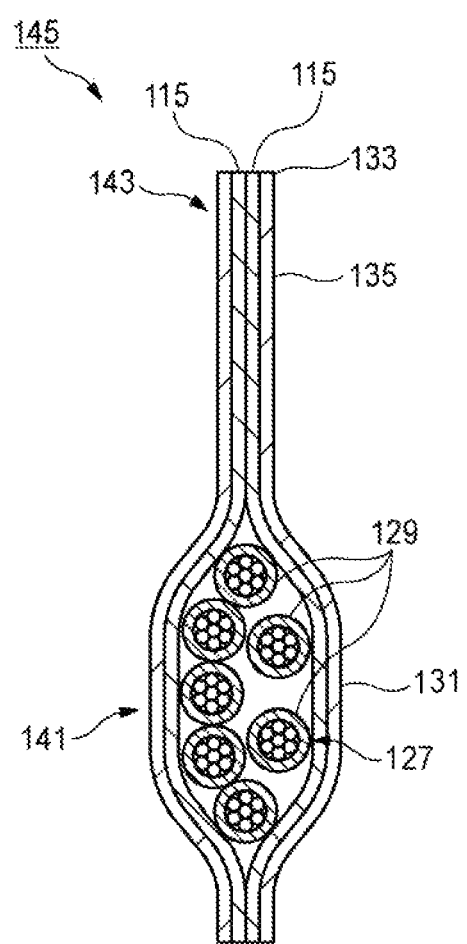
FIG. 14 is a cross-sectional view taken along line XIV-XIV in FIG. 13(b).

FIG. 13 is a process view describing the method of manufacturing the wire harness 145 with the wire harness sheet 141 illustrated in FIG. 12 according to procedures (a) and (b). FIG. 14 is a cross-sectional view taken along line XIV-XIV in FIG. 13(b).

First, as illustrated in FIG. 13(a), the linear electric wire bundle 127 is set on the sandwiching portion 131 of one sheet base material 143, the adhesive layer 115 of which faces upwards. At this time, the electric wire bundle 127 is stretched with pins so that the electric wire bundle 127 is not loose.

Subsequently, as illustrated in FIG. 13(b), the sheet base materials 143 are bonded together by overlapping the adhesive layer 115 of the other the sheet base material 143 with the adhesive layer 115 of the one sheet base material 143. At this time, the facing slits 117 and the facing rip-stopping portions 137 overlap each other, respectively, and both the sheet base materials 143 are adhesively fixed together. That is, the electric wire bundle 127 is adhesively fixed to the sandwiching portion 131 while the slits 117 and the rip-stopping portions 137 are respectively aligned with each other.

That is, in the method of manufacturing the wire harness according to the fourth embodiment, the sheet base materials 143 are bonded together by linearly placing the electric wire bundle 127 close to the second side portion 121 that is separated from the first side portion 119 of one of the two pieces of sheet base materials 143, and by overlapping the one sheet base material 143 with the other sheet base material 143. Accordingly, it is not necessary to fold back the sheet base material 143. The electric wire bundle 127 can be covered with the sheet base material 143 via an easy and short time operation, in a state of being interposed between the sheet base materials 143. Since the sheet base material 143 has a rectangular shape, the bonding operation can be simply performed. It is not necessary to locate and fix the electric wire bundle 127 while bending the electric wire bundle 127 along the bending shaped sheet base material as in the related art, and thus a skill is not required and the bonding operation is easily performed.

In the wire harness sheet 141 of the fourth embodiment, two pieces of sheet base materials 143 are used, and thus the size of the sheet base material 143 is made smaller compared to the third embodiment in which a piece of the sheet base material 113 is used. The wire harness sheet 141 is easy to store or handle.

Figure 15:
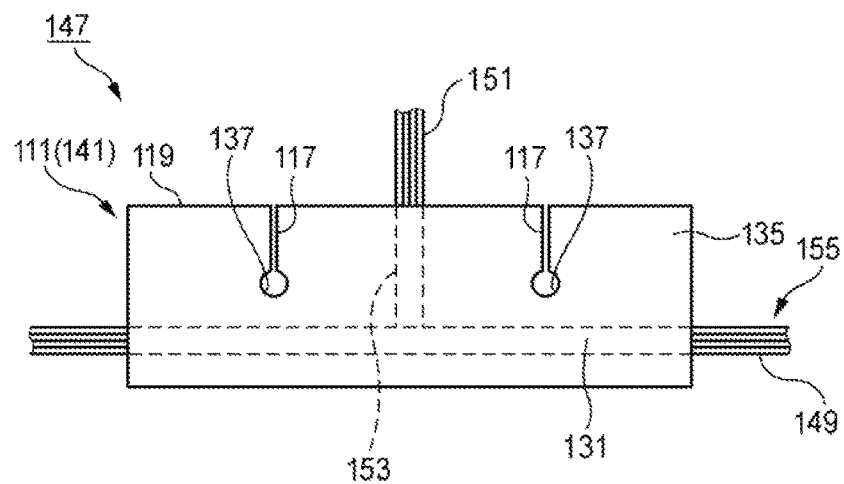
FIG. 15 is a plan view of a branched wire harness according to a modification example, in which the wire harness sheet according to the third or fourth embodiment of the present invention is used.
Figure 16:
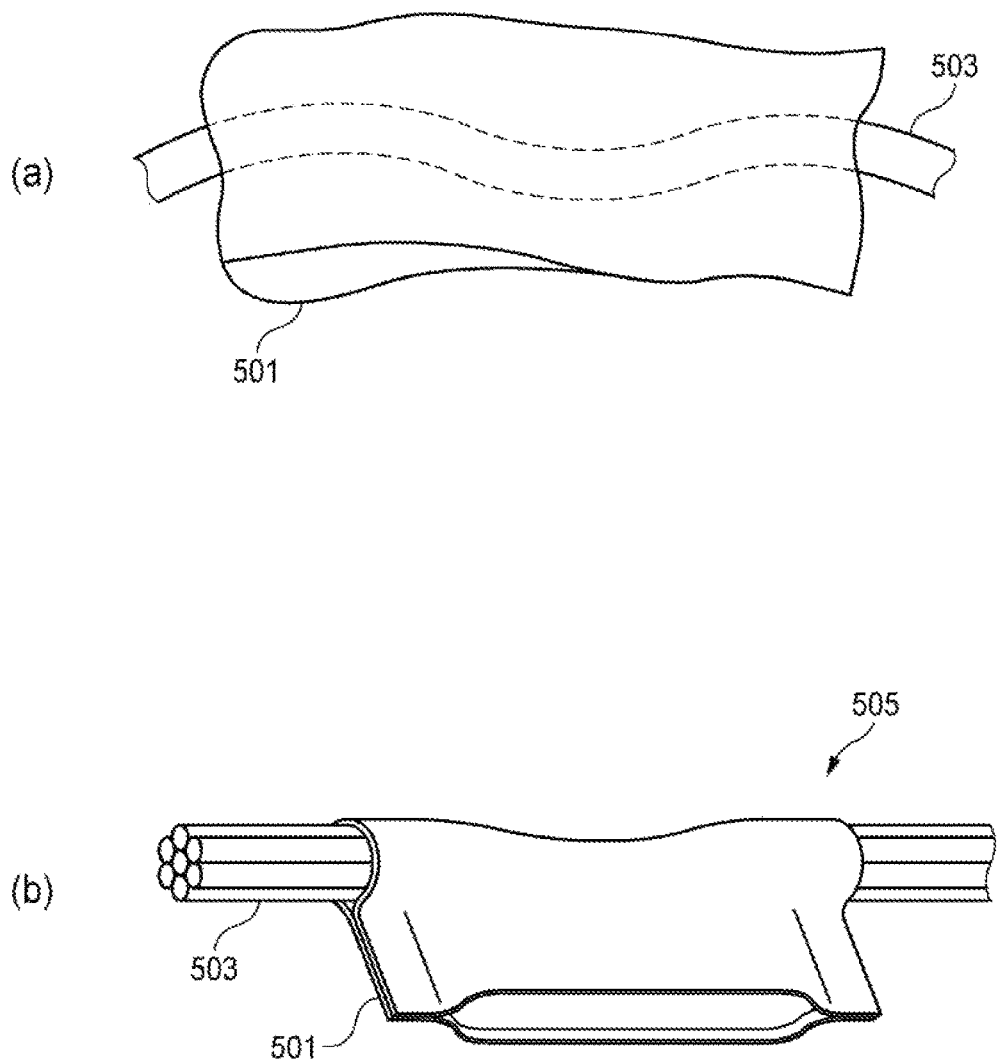
FIG. 16(a) is a plan view of a wire harness sheet of the related art, on which an electric wire bundle is placed.
FIG. 16(b) is a perspective view of a wire harness in which the wire harness sheet illustrated in FIG. 16(a) is bonded to itself.
Figure 17:
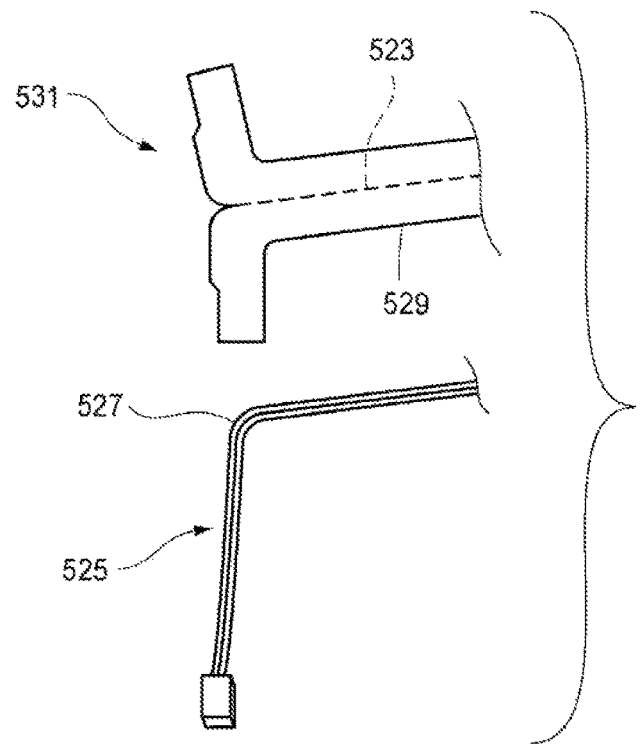
FIG. 17 is a plan view illustrating main portions of a wire harness sheet of the related art, which is folded back and adhesively fixed to a bending portion of an electric wire bundle, and illustrating a wire harness.
Figure 18:
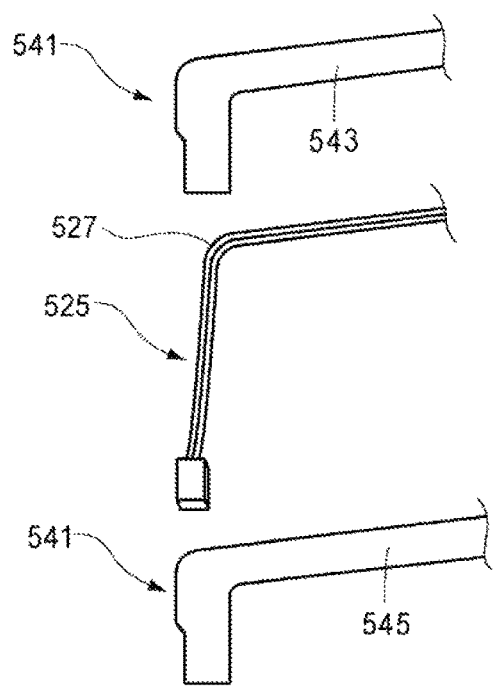
FIG. 18 is a plan view illustrating main portions of wire harness sheets of the related art, which overlap each other and are adhesively fixed to the bending portion of the electric wire bundle, and illustrating a wire harness.
Figure 19:
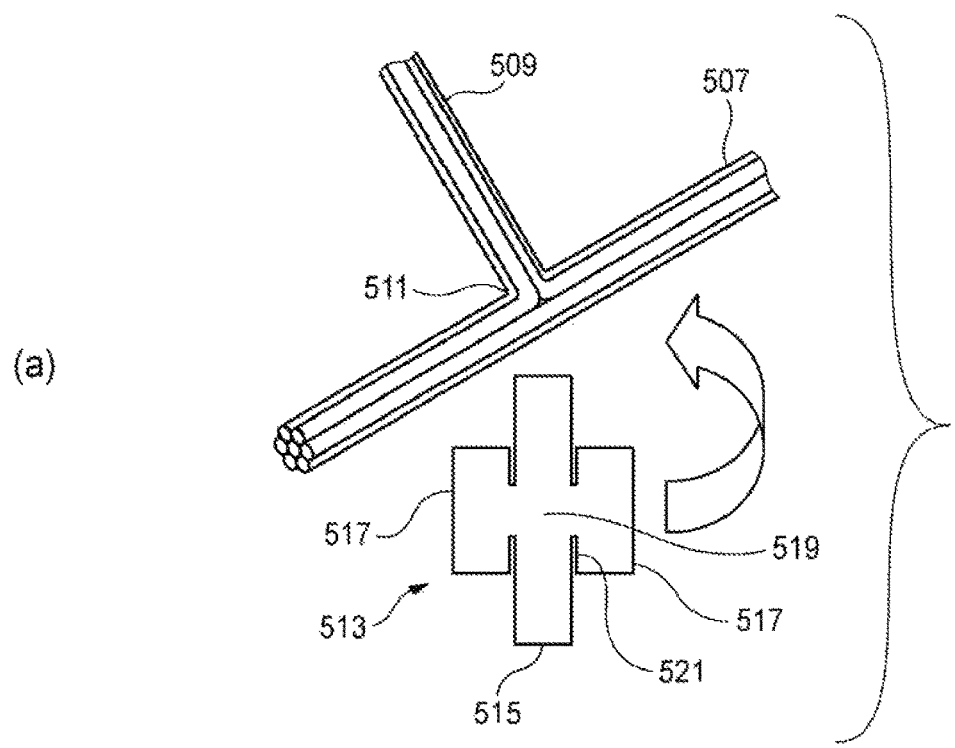
FIG. 19(a) is a perspective view illustrating an electric wire bundle having a T-shaped branched portion and a cross-shaped wire harness sheet.
FIG. 19(b) is a cross-sectional view describing a method of fixedly attaching the wire harness sheet illustrated in FIG. 19(a) to the T-shaped branched portion of the electric wire bundle.
Figure 19:
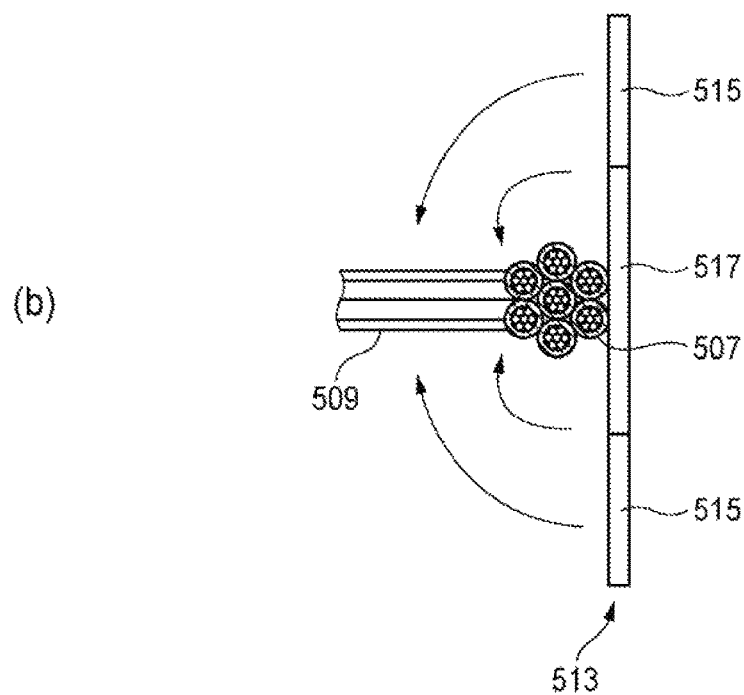

FIG. 15 is a plan view of a branched wire harness 147 according to a modification example, in which the wire harness sheet 111 or 141 according to the third or fourth embodiment of the present invention is used.

The wire harness sheet 111 (141) can be suitably used so as to protect a branched electric wire bundle 155 in which a branch wire 151 branches off from a main wire 149, for example, the branched electric wire bundle 155 having a T-shaped branched portion 153. That is, the wire harness sheet 111 (141) can be applied to both the linear electric wire bundle 127 and the branched electric wire bundle 155.

Similar to the electric wire bundle 127 described above, the main wire 149 of the branched electric wire bundle 155 is adhesively fixed to the sandwiching portion 131. The branch wire 151 is adhesively fixed to the bonding portion 135, and protrudes from the first side portion 119. Accordingly, it is possible to obtain the branched wire harness 147 covered with the wire harness sheet 111 (141).

In the wire harness sheet 111 (141), the wire harness 139 (145), and the method of manufacturing the wire harness 139 (145, 147) according to the third or fourth embodiment, it is possible to reduce costs via an improvement in a yield rate, and to easily perform a bonding operation.

It is possible to use a self-adhesive sheet for the respective wire harness sheets 11, 111, and 141 of the first, third and fourth embodiments. The self-adhesive sheet is bonded to itself when the self-adhesive layers are joined together. The self-adhesive sheet does not require a paste or a binding tape, and it is possible to simply bond the wire harness sheet to itself only by joining together the adhesive surfaces. Furthermore, the self-adhesive sheet has a special adhesive layer that prevents an electric wire bundle or the operator's hands from bonding thereto, and thus the efficiency of assembly work does not deteriorate. In the self-adhesive sheet, a surface material is laminated on an upper surface of the sheet base material made of a polypropylene (PP) form material, and the special adhesive layer is laminated on the other surface of the sheet base material. The following materials can be used as the surface material: kraft paper, a linerboard, a polyethylene-telephthalate (PET) film, a PP film, a non-woven fabric, and the like. The surface material has longitudinal tensile strength of 49 N/cm width, and a lateral tensile strength of 23 N/cm width (per JIS K—6767). The surface material has longitudinal internal tearing strength of 7.8 N, and lateral internal tearing strength of 6.8 N (per JIS K—6767). The surface material has a moisture vapor transmission rate of 0.0052 g/cm$^2$·24 hrs (per FS—101B), and has an initial adhesive force of 2.5 N/cm width (per a T-type peeling test). For example, it is possible to use Cro-nel (a trademark) made by the Crowell company in the United States or the like as a single-side self-adhesive sheet.

The adhesive layer of the present invention is not limited to the special adhesive layer. It is possible to use various well-known adhesive layers.

Hereinbelow, the characteristics of the wire harness sheet, the wire harnesses, and the methods of manufacturing the wire harnesses according to the embodiments of the present invention will be simply summarized in the following paragraphs (i) to (x).

[i] A wire harness sheet 11 or 49 includes:
a sheet base material 13 having a rectangular shape formed by a first side portion 19 and a second side portion 21 in which are parallel with each other and by a third side portion 23 and a fourth side portion 25 which are orthogonal to the first side portion 19 and the second side portion 21;
an adhesive layer 15 provided on one surface of the sheet base material 13 on which an electric wire bundle 27 is placed in parallel with the first side portion 19 and the second side portion 21; and
a slit 17 or 53 cut into the sheet base material 13 between at least one of the first side portion 19 and the second side portion 21 and a placement region 31 or 51 of the electric wire bundle 27, provided proximate to the third side portion 23 and the fourth side portion 25 respectively, and formed along the third side portion 23 and the fourth side portion 25 respectively.

[ii] In the wire harness sheet 11 disclosed in [i], the placement region 31 is provided so as to be equidistant from the first side portion 19 and the second side portion 21. The slit 17 is cut into the sheet base material 13 from both the first side portion 19 and the second side portion 21.

[iii] In the wire harness sheet 49 disclosed in [i], the placement region 51 is provided proximate to the first side portion 19. The slit 53 is cut into the sheet base material 13 from only the second side portion 21.

[iv] A wire harness 37 or 59 includes:
a sheet base material 13 having a rectangular shape formed by a first side portion 19 and a second side portion 21 which are parallel with each other and by a third side portion 23 and a fourth side portion 25 which are orthogonal to the first side portion 19 and the second side portion 21;
an adhesive layer 15 provided on one surface of the sheet base material 13 on which an electric wire bundle 27 is placed in parallel with the first side portion 19 and the second side portion 21;

a slit 17 or 53, cut into the sheet base material 13 between at least one of the first side portion 19 and the second side portion 21 and a placement region 31 or 51 of the electric wire bundle 27, provided proximate to each of the third side portion 23 and the fourth side portion 25, and formed along the third side portion 23 and the fourth side portion 25 respectively; and
the electric wire bundle 27 provided on the one surface of the sheet base material 13.

A pair of preliminary fixing sheet piece portions 33 or 55 which are formed on outer sides of the slits 17 or 53 of the sheet base material 13 are fixed to the electric wire bundle 27 by the adhesive layer 15, and.

A main fixing sheet piece portion 35 or 57 which is provided between the pair of preliminary fixing sheet piece portions 33 or 55 is fixed to the electric wire bundle 27 by the adhesive layer 15.

[v] A method of manufacturing a wire harness 37 or 59, in which a wire harness sheet 11 or 49 is used,
the wire harness sheet 11 or 49 including:
a sheet base material 13 having a rectangular shape formed by a first side portion 19 and a second side portion 21 which are parallel with each other and by a third side portion 23 and a fourth side portion 25 which are orthogonal to the first side portion 19 and the second side portion 21;
an adhesive layer 15 provided on one surface of the sheet base material 13 on which an electric wire bundle 27 is placed in parallel with the first side portion 19 and the second side portion 21; and
a slit 17 or 53, cut into the sheet base material 13 between at least one of the first side portion 19 and the second side portion 21 and a placement region 31 or 51 of the electric wire bundle 27, provided proximate to the third side portion 23 and the fourth side portion 25 respectively, and formed along the third side portion 23 and the fourth side portion 25 respectively,
the method including:
a step of placing the electric wire bundle 27 on the one surface of the sheet base material 13;
a step of fixing a pair of preliminary fixing sheet piece portions 33 or 55 which are formed on outer sides of the slits 17 or 53 of the sheet base material 13 to the electric wire bundle 27 by the adhesive layer 15; and
a step of fixing a main fixing sheet portion 35 or 57 which is provided between the pair of preliminary fixing sheet piece portions 33 or 55 to the electric wire bundle 27 by the adhesive layer 15 after the preliminary fixing sheet piece portions 33 or 55 are fixed to the electric wire bundle 27.

[vi] A wire harness sheet 111 or 141 includes:
a sheet base material 113 or 143 having a rectangular shape formed by a first side portion 119 and a second side portion 121 which are parallel with each other and by a third side portion 123 and a fourth side portion 125 which are orthogonal to the first side portion 119 and the second side portion 121, provided with an adhesive layer 115 formed on one surface of the sheet base material 113 or 143, and bonded to itself by folded back or by overlapped so as to adhesively fix an electric wire bundle 127 in parallel with the first side portion 119 by sandwiching the electric wire bundle 127 with a sandwiching portion 131 separated from the first side portion 119;
a slit 117 cut into a bonding portion 135 between a bonding end 133 of the first side portion 119 and the sandwiching portion 131; and
a circular rip-stopping portion 137 formed at an end of the slit 117, which is positioned in the sandwiching portion 131.

[vii] In the wire harness sheet 111 disclosed in [vi], the sheet base material 113 is made of a single piece and is folded back and adhesively fixed to itself.

[viii] In the wire harness sheet 141 disclosed in [vi], the sheet base material 143 is made of two pieces which are overlapped each other and adhesively fixed together.

[ix] A wire harness 139 or 145 includes a sheet base material 113 or 143 having a rectangular shape formed by a first side portion 119 and a second side portion 121 which are parallel with each other and by a third side portion 123 and a fourth side portion 125 which are orthogonal to the first side portion 119 and the second side portion 121, provided with an adhesive layer 115 formed on one surface of the sheet base material 113 or 143, and bonded to itself by folded back or by overlapped, so as to adhesively fix the electric wire bundle 127 in parallel with the first side portion 119 by sandwiching an electric wire bundle 127 with a sandwiching portion 131 separated from the first side portion 119;

a slit 117 cut into a bonding portion 135 between a bonding end 133 of the first side portion 119 and the sandwiching portion 131; and a circular rip-stopping portion 137 formed at an end of the slit 117 which is positioned in the sandwiching portion 131; and the electric wire bundle 127 provided on the one surface of the sheet base material 113 or 143.

The electric wire bundle 127 is adhesively fixed to the sandwiching portion 131 by folding back the sheet base material 113 or 143, or by overlapping the sheet base materials 113 or 143.

[x] A method of manufacturing a wire harness 139 or 145, in which a wire harness sheet 111 or 141 is used, the wire harness sheet 111 or 141 including:

a sheet base material 113 or 143 having a rectangular shape formed by a first side portion 119 and a second side portion 121 which are parallel with each other and by a third side portion 123 and a fourth side portion 125 which are orthogonal to the first side portion 119 and the second side portion 121, provided with an adhesive layer 115 formed on one surface of the sheet base material 113 or 143, and bonded to itself by folded back or by overlapped, so as to adhesively fix an electric wire bundle 127 in parallel with the first side portion 119 by sandwiching the electric wire bundle 127 with an sandwiching portion 131 separated from the first side portion 119;

a slit 117 cut into a bonding portion 135 between a bonding end 133 of the first side portion 119 and the sandwiching portion 131; and a circular rip-stopping portion 137 formed at an end of the slit 117 which is positioned in the sandwiching portion 131, the method including:

a step of adhesively fixing the electric wire bundle 127 to the sandwiching portion 131 by folding back the sheet base material 113 or 143, or by overlapping the sheet base materials 113 or 143, while the slits 117 and the rip-stopping portions 137 being respectively aligned with each other.

The present invention is not limited to the above-mentioned embodiments. Modifications and improvements can be appropriately made. In addition, insofar as the objects of the present invention can be achieved, the material, the shape, the dimension, and the disposition location of each configuration element, the number of the configuration elements, and the like in the above-mentioned embodiments are arbitrarily determined, and are not limited.

The present application claims priority from Japanese Patent Applications No. 2012-032014 filed on Feb. 16, 2012 and No. 2012-032013 filed on Feb. 16, 2012, the disclosure of which is hereby incorporated into the present application by reference.

INDUSTRIAL APPLICABILITY

In the wire harness sheet, the wire harness and the method of manufacturing the wire harness according to the present invention, it is possible to manually fix an electric wire bundle at an exact position without using special machine and bending the electric wire bundle. In addition, it is possible to reduce costs via an improvement in yield rate, and to easily perform an operation.

REFERENCE SIGNS LIST 11, 49, 111, 141: wire harness sheet
13, 113, 143: sheet base material
15, 115: adhesive layer
17, 53, 117: slit
19, 119: first side portion
21, 121: second side portion
23, 123: third side portion
25, 125: fourth side portion
27, 127: electric wire bundle
31, 51: placement region
33, 55: preliminary fixing sheet piece portion
35, 57: main fixing sheet portion
37, 59, 139, 145: wire harness
131: sandwiching portion
133: bonding end
135: bonding portion
137: rip-stopping portion

The invention claimed is:

1. A wire harness sheet comprising:
a sheet base material having a rectangular shape formed by a first side portion and a second side portion which are parallel with each other and by a third side portion and a fourth side portion which are orthogonal to the first side portion and the second side portion;
an adhesive layer provided on one surface of the sheet base material on which an electric wire bundle is placed in parallel with the first side portion and the second side portion;
slits, cut into the sheet base material between at least one of the first side portion and the second side portion and a placement region of the electric wire bundle, provided proximate to the third side portion and the fourth side portion respectively, and formed along each of the third side portion and the fourth side portion respectively, so that preliminary fixing sheet piece portions are formed;
a circular rip-stopping portion formed at an end of each of the slits which is positioned in a sandwiching portion,
wherein the slits each longitudinally extend orthogonal to the first side portion and the second side portion,
wherein in a direction parallel to the first side portion and the second side portion:
the placement region has a first length from one of the slits to another of the slits,
the preliminary fixing sheet piece portions each have a second length, and
the first length is greater than the second length,
wherein the electric wire bundle passes through opposite ends of the sheet base material, wherein the slits are cut in from the first side portion and the second side portion and the respective slits are aligned, wherein no slits are cut in from the third side portion and the fourth side portion, wherein the sheet base material is made of two layers, each layer comprising a same material, and wherein the two layers are overlapped with each other and adhesively fixed together.

2. The wire harness sheet according to the claim 1, wherein the placement region is provided so as to be equidistant from the first side portion and the second side portion, and the slits are cut into the sheet base material from both of the first side portion and the second side portion respectively.

3. The wire harness sheet according to the claim 1, wherein the placement region is provided proximate to the first side portion, and the slits are cut into the sheet base material from only the second side portion.

4. A wire harness sheet comprising:

a sheet base material having a rectangular shape formed by a first side portion and a second side portion which are parallel with each other and by a third side portion and a fourth side portion which are orthogonal to the first side portion and the second side portion;

an adhesive layer provided on one surface of the sheet base material on which an electric wire bundle is placed in parallel with the first side portion and the second side portion; and slits, cut into the sheet base material between at least one of the first side portion and the second side portion and a placement region of the electric wire bundle, provided proximate to the third side portion and the fourth side portion respectively, and formed along each of the third side portion and the fourth side portion respectively, so that preliminary fixing sheet piece portions are formed, wherein the slits each longitudinally extend orthogonal to the first side portion and the second side portion, wherein in a direction parallel to the first side portion and the second side portion:

the placement region has a first length from one of the slits to another of the slits, the preliminary fixing sheet piece portions each have a second length, and the first length is greater than the second length, and wherein the electric wire bundle passes through opposite ends of the sheet base material, wherein the slits comprise a first slit, a second slit, a third slit and a fourth slit, wherein the first slit and second slit are proximate to the third side portion and extend toward each other from ones of the first side portion and the second side portion and in parallel with the third side portion, and wherein the third slit and fourth slit are proximate to the fourth side portion and extend toward each other from ones of the first side portion and the second side portion and in parallel with the fourth side portion.

5. The wire harness sheet according to claim 4, wherein the placement region is provided so as to be equidistant from the first side portion and the second side portion, and the slits are cut into the sheet base material from both of the first side portion and the second side portion respectively.

6. The wire harness sheet according to claim 4, wherein the placement region is provided proximate to the first side portion, and the slits are cut into the sheet base material from only the second side portion.

* * * * *